(12) United States Patent
Gu et al.

(10) Patent No.: US 10,462,184 B1
(45) Date of Patent: Oct. 29, 2019

(54) SYSTEMS AND METHODS FOR ENFORCING ACCESS-CONTROL POLICIES IN AN ARBITRARY PHYSICAL SPACE

(71) Applicant: Symantec Corporation, Mountain View, CA (US)

(72) Inventors: Lei Gu, Bedford, MA (US); Ilya Sokolov, Boston, MA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 364 days.

(21) Appl. No.: 15/195,677

(22) Filed: Jun. 28, 2016

(51) Int. Cl.
*H04L 29/06* (2006.01)
*H04L 29/08* (2006.01)
*G06F 21/62* (2013.01)

(52) U.S. Cl.
CPC ............ *H04L 63/20* (2013.01); *H04L 63/101* (2013.01); *H04L 63/107* (2013.01); *H04L 67/18* (2013.01);
(Continued)

(58) Field of Classification Search
CPC ..... H04L 63/20; H04L 63/101; H04L 63/107; H04L 67/18; H04L 67/22; H04L 29/06;
(Continued)

(56) References Cited

U.S. PATENT DOCUMENTS 3,740,718 A 6/1973 Melvin, Jr.
3,744,043 A 7/1973 Walden et al.
(Continued)

FOREIGN PATENT DOCUMENTS

AU 2013371346 B2 3/2017
CA 2 895 265 C 2/2018
(Continued)

OTHER PUBLICATIONS

Fake GPS Location app, https://play.google.com/store/apps/details?id=com.lexa.fakegps&hl=en, as accessed Feb. 23, 2017, Lexa Tools.
(Continued)

*Primary Examiner* — Jayesh M Jhaveri
(74) *Attorney, Agent, or Firm* — FisherBroyles, LLP

(57) ABSTRACT

The disclosed computer-implemented method for enforcing access-control policies in an arbitrary physical space may include (i) identifying a collection of devices that are located within a predetermined physical space, (ii) determining the physical location of each device in the collection of devices, (iii) establishing, based on the collection of devices, (a) a list of controlled devices that are subject to an access-control policy and (b) a list of monitoring devices that are capable of monitoring user activity within a physical proximity, (iv) matching each controlled device with at least one monitoring device that is capable of monitoring user activity within physical proximity to the controlled device, and (v) monitoring, for each controlled device and by each monitoring device matched to the controlled device, user activity within proximity to the controlled device. Various other methods, systems, and computer-readable media are also disclosed.

20 Claims, 7 Drawing Sheets

(52) U.S. Cl.
CPC .............. *H04L 67/22* (2013.01); *G06F 21/62* (2013.01); *G06F 2221/2111* (2013.01); *H04L 63/0492* (2013.01)

(58) Field of Classification Search
CPC ..... H04L 29/08; H04L 63/0492; G06F 21/62; G06F 2221/2111
See application file for complete search history.

(56) References Cited

U.S. PATENT DOCUMENTS

| | | | |
|---|---|---|---|
| 5,867,578 | A | 2/1999 | Brickell et al. |
| 6,100,811 | A | 8/2000 | Hsu |
| 6,903,683 | B1 | 6/2005 | Nicholson |
| 6,970,183 | B1 | 11/2005 | Monroe |
| 7,657,097 | B2 | 2/2010 | Silic |
| 7,925,751 | B1 | 4/2011 | Bolinger et al. |
| 8,261,976 | B1 | 9/2012 | Block et al. |
| 8,316,421 | B2 | 11/2012 | Etchegoyen |
| 8,620,841 | B1 | 12/2013 | Filson |
| 8,719,590 | B1 | 5/2014 | Faibish et al. |
| 8,726,405 | B1 | 5/2014 | Bailey |
| 8,925,037 | B2 | 12/2014 | Marino et al. |
| 9,154,466 | B2 | 10/2015 | Sobel et al. |
| 9,171,178 | B1 | 10/2015 | Banerjee |
| 9,202,173 | B1 | 12/2015 | Dotan et al. |
| 9,218,468 | B1 | 12/2015 | Rappaport |
| 9,282,435 | B2 | 3/2016 | Ward et al. |
| 9,396,599 | B1 | 7/2016 | Malhotra |
| 9,479,250 | B2 | 10/2016 | Mitchell |
| 9,661,483 | B2 | 5/2017 | Bastianelli |
| 9,697,660 | B1 | 7/2017 | Sokolov et al. |
| 9,817,958 | B1 | 11/2017 | McCorkendale |
| 9,954,680 | B1 | 4/2018 | Machani et al. |
| 10,116,513 | B1 | 10/2018 | Sundaram |
| 10,326,733 | B2 | 6/2019 | Bokare et al. |
| 10,375,114 | B1 | 8/2019 | Gu et al. |
| 2002/0059532 | A1 | 5/2002 | Ata et al. |
| 2002/0080938 | A1 | 6/2002 | Alexander, III et al. |
| 2003/0172280 | A1 | 9/2003 | Scheidt |
| 2003/0216143 | A1 | 11/2003 | Roese |
| 2004/0143556 | A1 | 7/2004 | Graubart et al. |
| 2004/0153671 | A1 | 8/2004 | Schuyler et al. |
| 2005/0097320 | A1 | 5/2005 | Golan et al. |
| 2006/0031682 | A1 | 2/2006 | Sakai et al. |
| 2006/0082439 | A1 | 4/2006 | Bazakos et al. |
| 2006/0164282 | A1 | 7/2006 | Duff et al. |
| 2006/0210167 | A1 | 9/2006 | Inoue |
| 2007/0171921 | A1 | 7/2007 | Wookey |
| 2007/0210910 | A1 | 9/2007 | Norstrom et al. |
| 2008/0018458 | A1 | 1/2008 | Derrick et al. |
| 2009/0043445 | A1 | 2/2009 | Bishop et al. |
| 2009/0198112 | A1 | 8/2009 | Park et al. |
| 2010/0005526 | A1 | 1/2010 | Tsuji |
| 2010/0014721 | A1 | 1/2010 | Steinberg |
| 2010/0024042 | A1 | 1/2010 | Motahari |
| 2010/0037056 | A1 | 2/2010 | Follis et al. |
| 2010/0083385 | A1 | 4/2010 | Uchida |
| 2010/0205667 | A1 | 8/2010 | Anderson |
| 2010/0281254 | A1 | 11/2010 | Carro |
| 2010/0299002 | A1 | 11/2010 | Abdallah et al. |
| 2010/0302143 | A1 | 12/2010 | Spivack |
| 2010/0325712 | A1 | 12/2010 | Kakuta et al. |
| 2011/0206285 | A1 | 8/2011 | Hodge |
| 2011/0219423 | A1 | 9/2011 | Aad et al. |
| 2011/0219427 | A1 | 9/2011 | Hito |
| 2011/0225426 | A1* | 9/2011 | Agarwal .............. G06F 21/41 713/175 |
| 2011/0246766 | A1 | 10/2011 | Orsini et al. |
| 2011/0247069 | A1 | 10/2011 | Slater |
| 2011/0252131 | A1 | 10/2011 | Karaoguz |
| 2011/0293095 | A1* | 12/2011 | Ben Ayed .......... H04L 63/0492 380/270 |
| 2011/0321137 | A1 | 12/2011 | Iida |
| 2011/0321143 | A1 | 12/2011 | Angaluri et al. |
| 2012/0011559 | A1 | 1/2012 | Miettinen et al. |
| 2012/0044089 | A1 | 2/2012 | Yarnold |
| 2012/0072719 | A1 | 3/2012 | Hui et al. |
| 2012/0079576 | A1 | 3/2012 | Han et al. |
| 2012/0139755 | A1 | 6/2012 | Ginsberg |
| 2012/0181333 | A1 | 7/2012 | Krawczewicz |
| 2012/0185910 | A1 | 7/2012 | Miettinen |
| 2012/0190386 | A1 | 7/2012 | Anderson |
| 2012/0198570 | A1 | 8/2012 | Joa |
| 2012/0239929 | A1 | 9/2012 | Newman |
| 2012/0243687 | A1 | 9/2012 | Li |
| 2012/0246739 | A1 | 9/2012 | Mebed |
| 2012/0331527 | A1 | 12/2012 | Walters et al. |
| 2013/0010966 | A1 | 1/2013 | Li |
| 2013/0097709 | A1 | 4/2013 | Basavapatna |
| 2013/0102283 | A1 | 4/2013 | Lau |
| 2013/0103482 | A1 | 4/2013 | Song |
| 2013/0104203 | A1 | 4/2013 | Davis |
| 2013/0151617 | A1 | 6/2013 | Davis |
| 2013/0159876 | A1 | 6/2013 | Narasimhan et al. |
| 2013/0177157 | A1 | 7/2013 | Li |
| 2013/0197998 | A1 | 8/2013 | Buhrmann et al. |
| 2013/0227712 | A1 | 8/2013 | Salem |
| 2013/0262873 | A1 | 10/2013 | Read et al. |
| 2013/0275498 | A1 | 10/2013 | Cheng et al. |
| 2013/0290201 | A1 | 10/2013 | Rodriguez Carrillo |
| 2013/0298248 | A1 | 11/2013 | Boldrev |
| 2013/0318580 | A1 | 11/2013 | Gudlavenkatasiva et al. |
| 2013/0318625 | A1 | 11/2013 | Fan |
| 2013/0340089 | A1 | 12/2013 | Steinberg |
| 2014/0007225 | A1 | 1/2014 | Gay |
| 2014/0025485 | A1 | 1/2014 | Niemeijer |
| 2014/0040137 | A1 | 2/2014 | Carlson |
| 2014/0040467 | A1 | 2/2014 | Agarwal et al. |
| 2014/0067679 | A1 | 3/2014 | O'Reilly |
| 2014/0068702 | A1 | 3/2014 | Hyndman |
| 2014/0082715 | A1 | 3/2014 | Grajek |
| 2014/0112537 | A1 | 4/2014 | Frank et al. |
| 2014/0121476 | A1* | 5/2014 | Tran .................. A61B 5/0024 600/301 |
| 2014/0123255 | A1 | 5/2014 | Etchegoyen |
| 2014/0130127 | A1 | 5/2014 | Toole |
| 2014/0173700 | A1 | 6/2014 | Awan |
| 2014/0189786 | A1* | 7/2014 | Castro ................ H04L 63/105 726/1 |
| 2014/0201377 | A1 | 7/2014 | Kadishay et al. |
| 2014/0282870 | A1 | 9/2014 | Markwordt et al. |
| 2014/0380444 | A1 | 12/2014 | Kelley |
| 2015/0019873 | A1 | 1/2015 | Hagemann |
| 2015/0069219 | A1 | 3/2015 | Klein et al. |
| 2015/0082399 | A1 | 3/2015 | Wu |
| 2015/0089231 | A1 | 3/2015 | Oxford |
| 2015/0089568 | A1 | 3/2015 | Sprague et al. |
| 2015/0237038 | A1 | 8/2015 | Grajek et al. |
| 2015/0288687 | A1 | 10/2015 | Heshmati et al. |
| 2015/0324559 | A1 | 11/2015 | Boss |
| 2015/0349883 | A1 | 12/2015 | Mitchell |
| 2015/0363986 | A1 | 12/2015 | Hoyos |
| 2016/0007083 | A1 | 1/2016 | Gurha |
| 2016/0012655 | A1 | 1/2016 | Hanson |
| 2016/0044001 | A1 | 2/2016 | Pogorelik |
| 2016/0057110 | A1 | 2/2016 | Li |
| 2016/0063640 | A1 | 3/2016 | Ellingsworth |
| 2016/0068264 | A1 | 3/2016 | Ganesh |
| 2016/0080252 | A1* | 3/2016 | Ramachandran ..... G06F 16/285 709/238 |
| 2016/0082926 | A1 | 3/2016 | Mouser et al. |
| 2016/0087950 | A1 | 3/2016 | Barbir |
| 2016/0112522 | A1* | 4/2016 | Abello ................ H04L 67/22 709/224 |
| 2016/0112871 | A1* | 4/2016 | White ................ H04W 12/06 726/4 |
| 2016/0132684 | A1 | 5/2016 | Barbas |
| 2016/0140257 | A1 | 5/2016 | Vega |
| 2016/0164922 | A1 | 6/2016 | Boss |
| 2016/0165650 | A1 | 6/2016 | Kim |
| 2016/0165651 | A1 | 6/2016 | Pathuri et al. |
| 2016/0212109 | A1 | 7/2016 | Hird |
| 2016/0239683 | A1 | 8/2016 | Gujral et al. |

(56) References Cited

U.S. PATENT DOCUMENTS

| | | | |
|---|---|---|---|
| 2016/0241390 A1 | 8/2016 | Harris | |
| 2016/0316449 A1 | 10/2016 | Pitt | |
| 2016/0358441 A1 | 12/2016 | Mittleman | |
| 2016/0380650 A1 | 12/2016 | Calder et al. | |
| 2017/0053280 A1 | 2/2017 | Lishok et al. | |
| 2017/0083345 A1* | 3/2017 | Sol | G06F 21/35 |
| 2017/0163666 A1* | 6/2017 | Venkatramani | H04L 63/0272 |
| 2017/0195429 A1 | 7/2017 | Bokare et al. | |
| 2017/0255940 A1 | 9/2017 | Kohli | |
| 2018/0027517 A9 | 1/2018 | Noonan | |
| 2018/0103021 A1 | 4/2018 | Arunkumar | |
| 2018/0211464 A1* | 7/2018 | Kusens | G07C 9/00571 |
| 2018/0212976 A1 | 7/2018 | Arunkumar | |
| 2018/0249398 A1 | 8/2018 | Hillary | |

FOREIGN PATENT DOCUMENTS

| | | |
|---|---|---|
| CN | 101950332 A | 1/2011 |
| CN | 202795383 U | 3/2013 |
| CN | 103354931 A | 10/2013 |
| CN | 105874464 | 1/2019 |
| EP | 1 703 431 A2 | 9/2006 |
| EP | 2 941 733 A1 | 11/2015 |
| EP | 3 087 531 A1 | 11/2016 |
| EP | 3166086 A1 | 5/2017 |
| JP | 2006259930 A | 9/2006 |
| JP | 2007293062 A | 11/2007 |
| JP | 2007304834 A | 11/2007 |
| JP | 2009086891 A | 4/2009 |
| JP | 2009140051 A | 6/2009 |
| JP | 20090140051 A | 6/2009 |
| JP | 2010128778 A | 5/2010 |
| JP | 20100128778 A | 6/2010 |
| JP | 2011004214 A | 1/2011 |
| JP | 2011134137 A | 7/2011 |
| JP | 20120235424 A | 11/2012 |
| JP | 2012248027 A | 12/2012 |
| JP | 20130246465 A | 12/2013 |
| JP | 2014086865 A | 5/2014 |
| JP | 2016-503208 | 2/2016 |
| JP | 6205062 B2 | 9/2017 |
| JP | 6314267 B2 | 4/2018 |
| WO | WO 2012/162009 A1 | 11/2012 |
| WO | 2013101215 A1 | 7/2013 |
| WO | 2014/107435 A1 | 7/2014 |
| WO | 2015/100192 A1 | 7/2015 |

OTHER PUBLICATIONS

How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.

Assisted GPS, https://en.wikipedia.org/wiki/Assisted_GPS, as accessed Feb. 24, 2017, Wikipedia.

Lei Gu, et al; Systems and Methods for Enforcing Access-Control Policies; U.S. Appl. No. 15/194,403, filed Jun. 27, 2016.

HomeNews—WiFi can be used to count people with or without electronic gadgets; https://www.rt.com/news/266188-wifi-signal-human-density/; as accessed on Jun. 21, 2016; Jun. 10, 2015.

Ali et al.; Keystroke Recognition Using WiFi Signals; https://www.sigmobile.org/mobicom/2015/papers/p90-aliA.pdf; Sep. 7, 2015.

IRobot's Roomba 980 Maps Your Home via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.

Microsoft Hololens; https://www.microsoft.com/microsoft-hololens/en-us; as accessed on Jun. 21, 2016.

Bruce McCorkendale, et al; Systems and Methods for Constructing a Volumetric Model of a Space from a Constellation of Sensing Devices; U.S. Appl. No. 14/833,655, filed Aug. 24, 2015.

Daniel Marino, et al; Systems and Methods for Enforcing Data-Loss-Prevention Policies Using Mobile Sensors; U.S. Appl. No. 13/733,131, filed Jan. 2, 2013.

Devicelock; Preventing Devastating Data Leaks by Securing the Endpoints of Your Network; http://www.devicelock.com/products/, as accessed on Sep. 10, 2012.

Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.

OMA Device Management; http://openmobilealliance.org/about-oma/work-program/device-management/, as accessed Jun. 25, 2015; Jan. 15, 2013.

Open Mobile Alliance (OMA); http://openmobilealliance.org/, as accessed Jun. 25, 2015; Aug. 2, 2002.

OpenHAB; http://www.openhab.org/, as accessed Jun. 25, 2015; Jul. 11, 2011.

Daniel Siewiorek; SenSay: A Context-Aware Mobile Phone; Human Computer Interaction and Institute for Complex Engineered Systems; As accessed on Sep. 10, 2012.

Megan Treacy; 10 environmental sensors that go along with you; http://www.treehugger.com/clean-technology/environmental-sensors.html, as accessed Jun. 25, 2015; Mar. 5, 2013.

Zenprise; Mobile DLP (Data Leakage Prevention); http://www.zenprise.com/solutions/mobile-data-leakage-prevention/, as accessed on Sep. 10, 2012.

Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.

Jason Franklin et al.; Passive Data Link Layer 802.11 Wireless Device Driver Fingerprinting; Proceedings of USENIX Security '06, Jul. 31-Aug. 4, 2006, Vancouver, BC, Canada.

School of Privacy, Guide on How to be Safe, Secure and Protect Your Online Anonymity; Fake GPS Location—Android; http://school-of-privacy.com/post/70381068300/fake-gps-location-andoid; Dec. 18, 2013.

SensorSimulator; https://code.google.com/p/openintents/wiki/SensorSimulator; Jan. 12, 2013.

William E. Sobel, et al.; Systems and Methods for Introducing Variation in Sub-System Output Signals to Prevent Device Fingerprinting; U.S. Appl. No. 14/139,824, filed Dec. 23, 2013.

C. Rigney et al; Remote Authentication Dial in User Service (RADIUS); https://tools.ietf.org/html/rfc2865, as accessed Nov. 6, 2015; Request for Comments: 2865; Jun. 2000.

C. Neuman et al; The Kerberos Network Authentication Service (V5); https://tools.ietf.org/html/rfc4120, as accessed Nov. 6, 2015; Request for Comments: 4120; Jul. 2005.

Kerberos: The Network Authentication Protocol; http://web.mit.edu/kerberos/, as accessed Nov. 6, 2016; Jan. 28, 1999.

Microsoft Negotiate; https://msdn.microsoft.com/en-us/library/windows/desktop/aa378748(v=vs.85).aspx. as accessed Nov. 6, 2015; Nov. 13, 2011.

Microsoft NTLM; https://msdn.microsoft.com/en-us/library/windows/desktop/aa378749(v=vs.85).aspx, as accessed Nov. 6, 2015; Nov. 12, 2011.

Prasad Bokare, et al; Systems and Methods for Facilitating Single Sign-On for Multiple Devices; U.S. Appl. No. 15/041,040, filed Feb. 11, 2016.

Symantec Identity Access Manager; https://www.symantec.com/identity-access-manager/, as accessed Nov. 6, 2015; Symantec Corporation; Nov. 7, 2014.

Symantec Validation and ID Protection Service; http://www.symantec.com/vip-authentication-service/, as accessed Nov. 6, 2015; Symantec Corporation; Feb. 10, 2014.

Ramakrishnan Meenakshi Sundaram; Systems and Methods for Managing Smart Building Systems; U.S. Appl. No. 15/041,002, filed Feb. 10, 2016.

ZigBee Alliance, http://www.zigbee.org/, as accessed Dec. 14, 2015, (Nov. 14, 2001).

Z-Wave, http://www.z-wave.com/, as accessed Dec. 14, 2015, (Dec. 23, 2002).

(56) References Cited

OTHER PUBLICATIONS

OMA Device Management Working Group, http://openmobilealliance.org/about-oma/work-program/device-management/, as accessed Dec. 14, 2015 (Jan. 15, 2013).
Bruce McCorkendale; Systems and Methods for Authenticating Users; U.S. Appl. No. 14/834,949, filed Aug. 25, 2015.
Home—Good Security Questions; http://goodsecurityquestions.com/, as accessed Jun. 25, 2015, (Dec. 27, 2007).
Kevin Jiang, et al; Systems and Methods for Using Vehicles as Information Sources for Knowledge-Based Authentication; U.S. Appl. No. 14/979,620, filed Dec. 28, 2015.
Snapshot; https://www.progressive.com/auto/snapshot/, as accessed Nov. 18, 2015; Progressive Casualty Insurance Company; On or before Nov. 18, 2015.
FasTrak; https://www.bayareafastrak.org/en/howitworks/gettingstarted.shtml, as accessed Nov. 18, 2015; On or before Nov. 18, 2015.
Ilya Sokolov, et al; Systems and Methods for Verifying User Attributes; U.S. Appl. No. 14/985,675, filed Dec. 31, 2015.
E-ZPass, https://www.e-zpassny.com/en/home/index.shtml, as accessed Nov. 18, 2015, (On or before Nov. 18, 2015).
Fastpass, https://disneyland.disney.go.com/guest-services/fastpass/, as accessed Nov. 18, 2015, Disney, (On or before Nov. 18, 2015).
Toll Payment Options at the Golden Gate Bridge, http://www.goldengate.org/tolls/tollpaymentoptions.php, as accessed Nov. 18, 2015, (On or before Nov. 18, 2015).
OnStar, https://www.onstar.com/us/en/home.html, as accessed Nov. 18, 2015, (On or before Nov. 18, 2015).
BMW Assist, http://www.bmwusa.com/Standard/Content/Explore/BMWValue/BMWAssist/default.aspx, as accessed Nov. 18, 2015, (On or before Nov. 18, 2015).
Department of Motor Vehicles, https://www.dmv.ca.gov/portal/dmv, as accessed Nov. 18, 2015, (On or before Nov. 18, 2015).
Ilya Sokolov, et al; Systems and Methods for Evaluating Identity Intensity; U.S. Appl. No. 15/057,618, filed Mar. 1, 2016.
Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Ilya Sokolov et al; Systems and Methods for Certifying Geolocation Coordinates of Computing Devices; U.S. Appl. No. 15/466,156, filed Mar. 22, 2017.
Ilya Sokolov et al.; Systems and Methods for Securely Sharing Cloud-Service Credentials Within a Network of Computing Devices; U.S. Appl. No. 15/276,105, filed Sep. 26, 2016.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.
Norton Identity Safe, announced Aug. 28, 2007: https://identitysafe.norton.com/.
Abadi et al, Traffic Flow Predicition for Road Transporation Networks with Limited Traffic Data, IEEE, vol. 16, No. 2, Apr. 2015, pp. 653-662.
Baek et al, An Authentication Framework for Automatic Dependent Survelliance-Broadcast Based on Online/Offline Identity-Based Signature, IEEE, 2013, pp. 358-363.
Michael Buhrmann, et al.; Mobile Wallet Security; U.S. Appl. No. 61/591,232, filed Jan. 26, 2012.
Malek Ben Salem, et al.; Adaptive Risk-Based Access Controls; U.S. Appl. No. 61/602,427, filed Feb. 23, 2012.
Temple, James, "Accelerometer IDs smartphones in seconds", SFGATE, URL: http://www.sfgate.com/technology/dotcommentary/article/accelerometer-IDs-smartphone-in-seconds-4885711.php, Oct. 10, 2013, 6 pages.
International Search Report and Written Opinion received for International Patent Application Serial No. PCT/US2013/078319 dated Apr. 16, 2014, 7 pages.
International Search Report and Written Opinion received for International Patent Application Serial No. PCT/US2014/071791 dated Mar. 19, 2015, 8 pages.
Nair et al., "On Channel Failures, File Fragmentation Policies, and Heavy-Tailed Completion Times", IEEE/ACM Transactions on Networking, vol. 24, No. 1, Feb. 2016, pp. 529-541.
Ciriani et al., "Combining Fragmentation and Encryption to Protect Privacy in Data Storage", ACM Transactions on Information and System Security (TISSEC), vol. 13, No. 3, Article 22, Jul. 2010, 33 pages.
Mei et al., "Secure Dynamic Fragment and Replica Allocation in Large-Scale Distributed File Systems", IEEE Transactions on Parallel and Distributed Systems, vol. 14, No. 9, Sep. 2003, pp. 885-896.
Zola et al., "ENIGMA: Distributed Virtual Disks for Cloud Computing", IEEE International Parallel and Distributed Processing Symposium, 2011, pp. 898-906.

* cited by examiner

SYSTEMS AND METHODS FOR ENFORCING ACCESS-CONTROL POLICIES IN AN ARBITRARY PHYSICAL SPACE

BACKGROUND

Individuals and organizations frequently seek to control how others access services under their control. For example, a parent may wish to enforce parental controls on televisions and smart phones in their household in order to control their child's access to various digital media. Similarly, an organization may wish to limit websites that its employees can access during work hours. In some cases, an individual or organization may use different access-control policies for certain people. For example, a parent can input a passcode to bypass parental controls so that they can watch movies that would otherwise be blocked. As an additional example, a project manager may have access to files and/or servers that other employees may be restricted from accessing.

Unfortunately, traditional access-control techniques suffer from a number of drawbacks. Some devices may be unable to execute access-control software. In other cases, an administrator may be unable or unwilling to install endpoint security software on certain devices. Even worse, clever users may be able to circumvent access-control software by uninstalling software, killing processes, spoofing their identity, or otherwise tampering with the access-control software. Furthermore, controls on shared machines may be unable to enforce proper policies if they are unable to properly identify the user that is accessing the content. Accordingly, the instant disclosure identifies and addresses a need for improved systems and methods for enforcing access-control policies in an arbitrary physical space.

SUMMARY

As will be described in greater detail below, the instant disclosure describes various systems and methods for enforcing access-control policies in an arbitrary physical space by determining the physical locations of various devices, then matching monitoring devices with controlled devices. These monitoring devices may enable various access-control systems to enforce appropriate access-control policies based on who is attempting to access the controlled devices.

In one example, a computer-implemented method for may include (i) identifying a collection of devices that are located within a predetermined physical space, (ii) determining the physical location of each device in the collection of devices, (iii) establishing, based on the collection of devices, (a) a list of controlled devices that are subject to an access-control policy and (b) a list of monitoring devices that are capable of monitoring user activity within a physical proximity, (iv) matching each controlled device with at least one monitoring device that is capable of monitoring user activity within physical proximity to the controlled device, and (v) monitoring, for each controlled device and by each monitoring device matched to the controlled device, user activity within proximity to the controlled device. In one embodiment, the monitoring device used to map the boundary features of the predetermined physical space may include a self-propelled monitoring device that is capable of moving through the predetermined physical space.

In some examples, identifying the collection of devices may include identifying a command-and-control device that maintains a registry of devices registered to the command-and-control device. In such examples, identifying the collection of devices may include executing a device-discovery function of the command-and-control device. The computer-implemented method may also track the locations of these devices over time. For example, the computer-implemented method may include tracking the physical location of at least one monitoring device over time.

In some examples, the list of monitoring devices may contain a variety of information. For example, establishing the list of monitoring devices may further include associating each monitoring device in the list of monitoring devices with the monitoring functions that are available to the monitoring device.

In certain embodiments, the computer-implemented method may match monitoring devices to controlled devices using a variety of criteria. For example, matching the controlled device with the monitoring device may include determining that the monitoring device is capable of monitoring a particular region in proximity to the controlled device.

In some embodiments, the computer-implemented method may include separating an arbitrary physical space into regions. For example, the method may include mapping, by at least one monitoring device, boundary features of the predetermined physical space. In one example, the boundary features may denote separations between distinct regions of the predetermined physical space. In one embodiment, the boundary features may include (i) a wall, (ii) a window, (iii) a threshold, (iv) stairs, and/or (v) a railing.

The computer-implemented may include performing a variety of security actions based on activity observed while monitoring the controlled device. For example, the computer-implemented method may include performing, based on monitoring user activity within proximity to the controlled device, a security action that may include (i) disabling the controlled device, (ii) disabling a function of the controlled device, and/or (iii) generating a log entry that describes the user activity within proximity to the controlled device.

In one embodiment, a system for implementing the above-described method may include (i) an identification module, stored in memory, that identifies a collection of devices that are located within a predetermined physical space, (ii) a determination module, stored in memory, that determines the physical location of each device in the collection of devices, (iii) an establishing module, stored in memory, that establishes, based on the collection of devices, (a) a list of controlled devices that are subject to an access control policy and (b) a list of monitoring devices that are capable of monitoring user activity within a physical proximity, (iv) a matching module, stored in memory, that matches each controlled device with at least one monitoring device that is capable of monitoring user activity within physical proximity to the controlled device, (v) a monitoring module, stored in memory, that monitors, for each controlled device and by each monitoring device matched to the controlled device, user activity within proximity to the controlled device, and (vi) at least one physical processor configured to execute the identification module, the determination module, the establishing module, the matching module, and the monitoring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a collection of devices that are located within a predetermined physical space, (ii) determine the physical location of each device in the collection of devices, (iii) establish, based on the collection of devices, (a) a list of controlled devices that are subject to an access-control policy and (b) a list of monitoring devices that are capable of monitoring user activity within a physical proximity, (iv) match each controlled device with at least one monitoring device that is capable of monitoring user activity within physical proximity to the controlled device, and (v) monitor, for each controlled device and by each monitoring device matched to the controlled device, user activity within proximity to the controlled device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
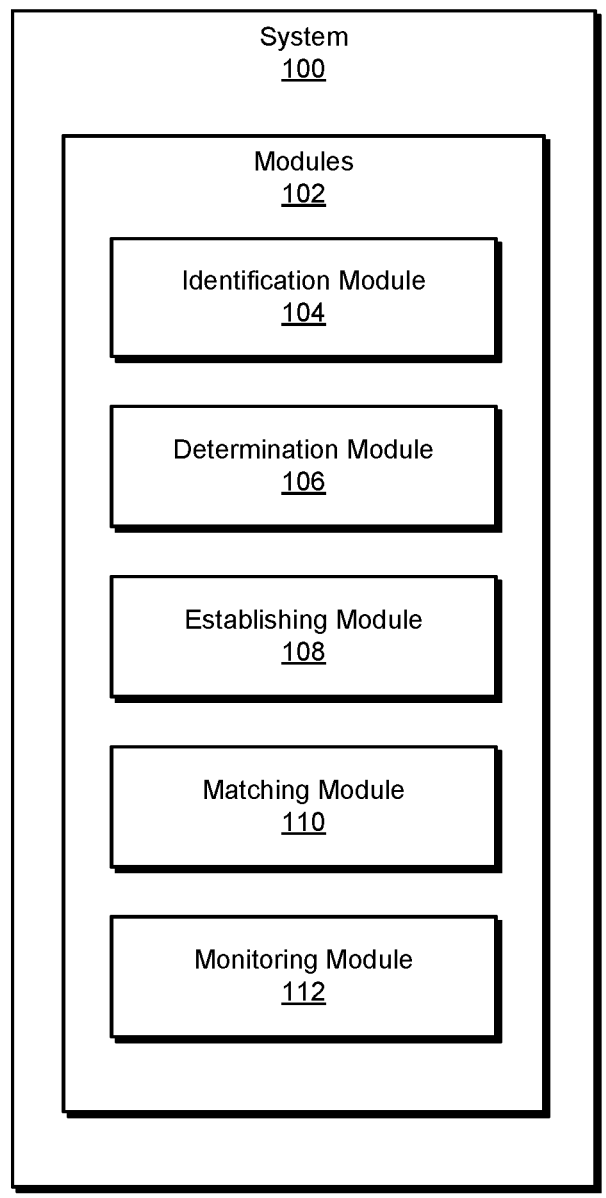
FIG. 1 is a block diagram of an example system for enforcing access-control policies in an arbitrary physical space.

Throughout the drawings, identical reference characters and descriptions indicate similar, but not necessarily identical, elements. While the embodiments described herein are susceptible to various modifications and alternative forms, specific embodiments have been shown by way of example in the drawings and will be described in detail herein. However, the embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing access-control policies in an arbitrary physical space. As will be explained in greater detail below, the systems and methods described herein may allow access-control systems to monitor controlled devices regardless of the nature of the device and regardless of the physical space surrounding the controlled device.

Figure 2:
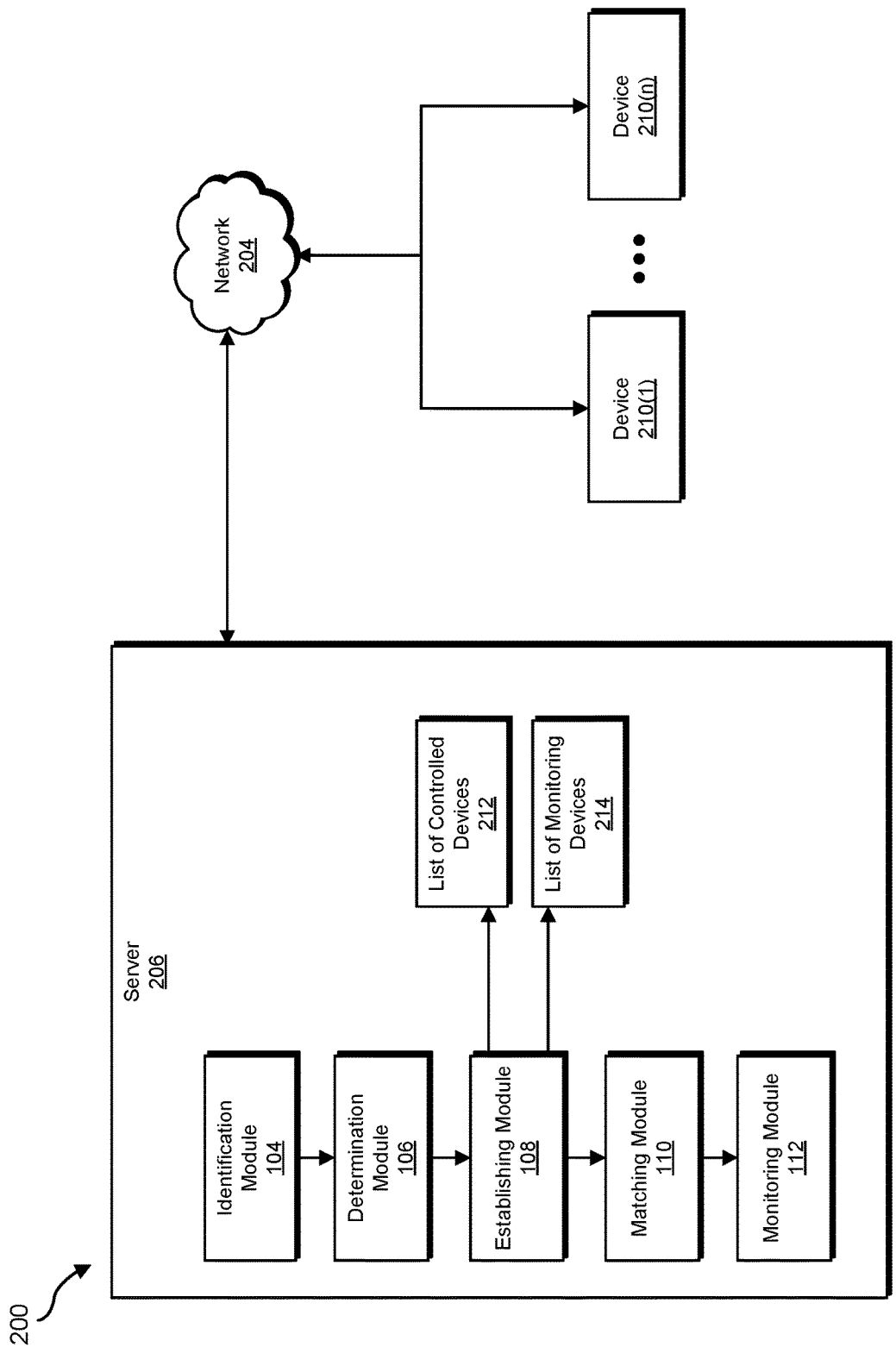
FIG. 2 is a block diagram of an additional example system for enforcing access-control policies in an arbitrary physical space.

The following will provide, with reference to FIGS. 1-2, detailed descriptions of example systems for enforcing access-control policies in an arbitrary physical space. Detailed descriptions of corresponding computer-implemented methods will also be provided in connection with FIG. 3. Detailed descriptions of access-control systems that enforce control policies through auxiliary devices will be provided in connection with FIG. 4. Detailed descriptions of an example system for matching controlled devices with monitoring devices will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of a system 100 for enforcing access-control policies in an arbitrary physical space. As illustrated in this figure, system 100 may include one or more modules 102 for performing one or more tasks. For example, and as will be explained in greater detail below, system 100 may include an identification module 104 that identifies a collection of devices that are located within a predetermined physical space. System 100 may additionally include a determination module 106 that determines the physical location of each device in the collection of devices. System 100 may also include an establishing module 108 that establishes, based on the collection of devices, a list of controlled devices that are subject to an access-control policy and a list of monitoring devices that are capable of monitoring user activity within a physical proximity. System 100 may additionally include a matching module 110 that matches each controlled device with at least one monitoring device that is capable of monitoring user activity within physical proximity to the controlled device. System 100 may also include a monitoring module 112 that monitors, for each controlled device and by each monitoring device matched to the controlled device, user activity within proximity to the controlled device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 206 and/or one or more of devices 210(1)-(n)), computing system 610 in FIG. 6, and/or portions of network architecture 700 in FIG. 7. One or more of modules 102 in FIG. 1 may also represent all or portions of one or more special-purpose computers configured to perform one or more tasks.

System 100 in FIG. 1 may be implemented in a variety of ways. For example, all or a portion of system 100 may represent portions of system 200 in FIG. 2. As shown in FIG. 2, system 200 may include devices 210(1)-(n) in communication with a server 206 via a network 204. In one example, one or more of devices 210(1)-(n) may be programmed with one or more of modules 102. Additionally or alternatively, server 206 may be programmed with one or more of modules 102.

In one embodiment, one or more of modules 102 from FIG. 1 may, when executed by at least one processor of server 206 and/or one or more of devices 210(1)-(n), enable server 206 and/or devices 210(1)-(n) to utilize monitoring devices to monitor the physical space around a controlled device. For example, and as will be described in greater detail below, identification module 104 may identify a collection of devices that are located within a predetermined physical space. Determination module 106 may then determine the physical location of each device in the collection of devices. Establishing module 108 may then establish, based on the collection of devices, lists of controlled devices and monitoring devices. Matching module 110 may then match each controlled device with at least one monitoring device that is capable of monitoring user activity within physical proximity to the controlled device. Finally, monitoring module 112 may monitor, for each controlled device and by each monitoring device matched to the controlled device, user activity within proximity to the controlled device.

Server 206 generally represents any type or form of computing device that is capable of identifying various devices, sorting the devices according to role, and matching monitoring devices with controlled devices. Examples of server 206 include, without limitation, application servers and database servers configured to provide various database services and/or run certain software applications. In some embodiments, server 206 may represent a command-and-control device that monitors and enforces access-control policies for a collection of controlled devices. Such a command-and-control device may enforce the access control policies through auxiliary devices that are connected to and/or control access to resources used by a controlled device. For example, a personal computer may be attached to a smart power supply and a router. A command-and-control device may instruct the power supply and/or router to take various actions, thus enabling the command-and-control device to enforce access-control policies for the personal computer even if the command-and-control device is unable to interact directly with the personal computer.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network architecture 700 in FIG. 7, or the like. Network 204 may facilitate communication or data transfer using wireless or wired connections. In one embodiment, network 204 may facilitate communication between devices 210(1)-(*n*) and server 206.

Devices 210(1)-(*n*) generally represent any type or form of device that may interact with users. In some examples, one or more of devices 210(1)-(*n*) may be a controlled device. Additionally or alternatively, one or more of devices 210(1)-(*n*) may be a monitoring device. The term "controlled device," as used herein, generally refers to any device that an administrator may wish to monitor. In some examples, a controlled device may be subjected to monitoring through software installed on the controlled device. In some embodiments, a controlled device may be connected to an auxiliary device that allows another device to enforce access-control policies on the controlled device. For example, a controlled device may be connected to a smart power source that may turn off power to the controlled device at the direction of a command-and-control server that enforces an access-control policy. Due to a variety of factors, a controlled device may not be installed with access-control software. In these examples, control over such a controlled device may come exclusively through control over other devices connected to the controlled device, such as a router and/or a power source. Some examples of controlled devices include, without limitation, personal computers, mobile phones, televisions, network routers and/or gateways, smart watches, and/or any other device that a parent and/or administrator may wish to control.

As mentioned above, controlled devices may be subject to access-control policies. The term "access-control policy," as used herein, generally refers to any rule or set of rules that describes circumstances under which users are or are not allowed to access certain functions of a controlled device. Access-control policies may restrict access to content based on a variety of factors, such as the identity of the user, the time at which the user attempts to access the content, the location from where the user attempts to access the content, the nature of the content being accessed, or any other suitable metric that may be used to determine whether or not a particular user should have access to certain content and/or functionalities of a device. As a specific example, a parent may enable parental controls on a smart phone to prevent a child from making in-application purchases without parental approval. As an additional example, a corporation may enact access-control policies to prevent guests to a building from inappropriately accessing internal networks.

The term "monitoring device," as used herein, generally refers to any device or combination of devices that is capable of capturing information about its surroundings and providing that information to another device. Monitoring devices may include a variety of components capable of capturing information about a user, such as a camera, microphone, infrared sensor, wireless antenna, or any other suitable component capable of capturing information that may be used to identify a user. Examples of monitoring devices include, without limitation, laptops, smart phones, smart watches, smart TVs, tablet computers, security cameras, and/or any other device that is capable of capturing information about a space around a controlled device.

In certain embodiments, a single device may simultaneously be both a controlled device and a monitoring device. For example, a smartphone may be subject to certain access-control policies, and thus be categorized as a controlled device. However, the smartphone may also be equipped with a camera and a microphone, both of which can capture information about users in proximity to the smartphone. Such a smartphone may also be categorized as a monitoring device. As will be described in greater detail below, this may mean that the smartphone may be matched to itself for purposes of matching controlled devices to monitoring devices.

Figure 3:
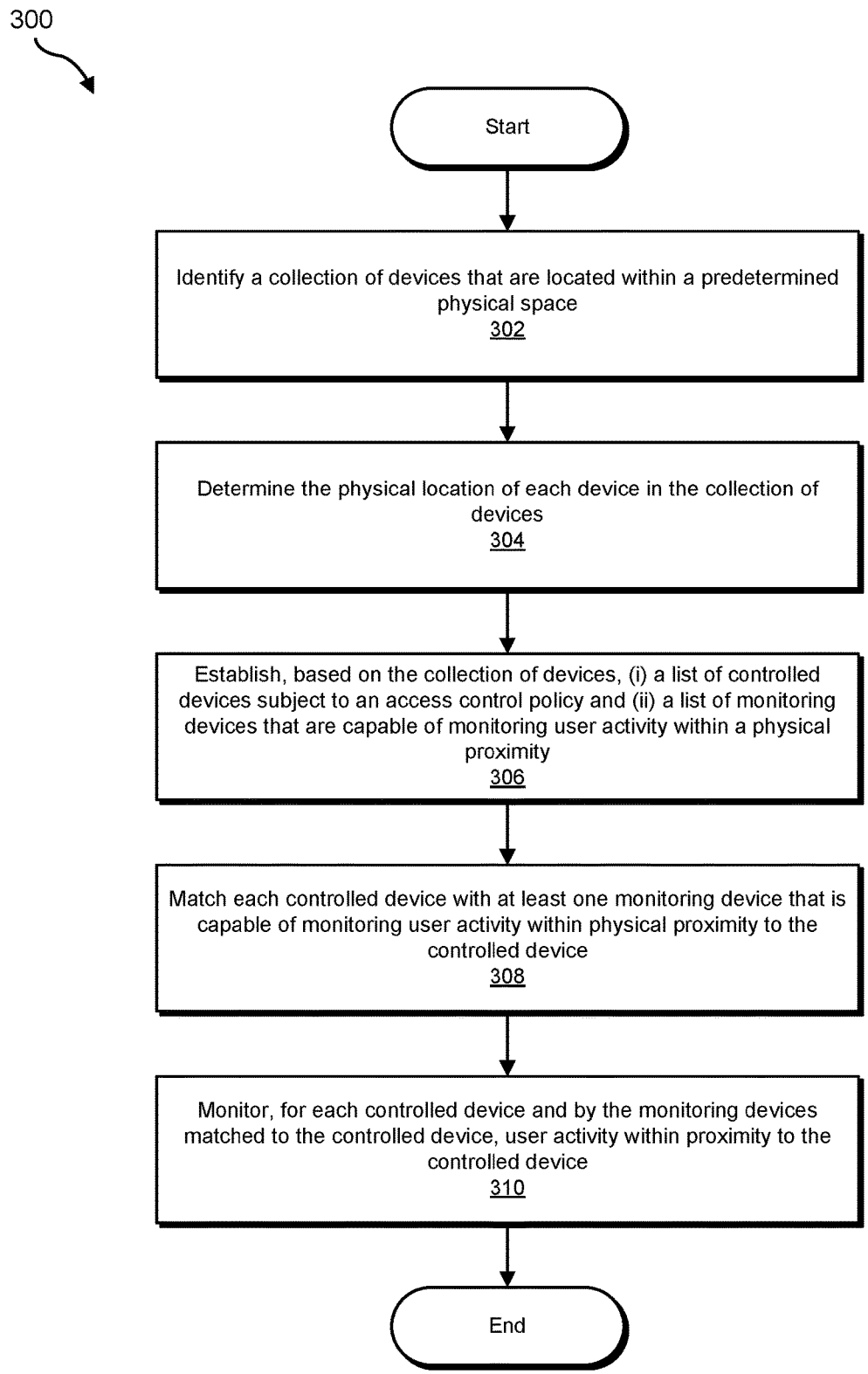
FIG. 3 is a flow diagram of an example method for enforcing access-control policies in an arbitrary physical space.

FIG. 3 is a flow diagram of an example computer-implemented method 300 for enforcing access-control policies in an arbitrary physical space. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of network architecture 700 in FIG. 7.

As illustrated in FIG. 3, at step 302, one or more of the systems described herein may identify a collection of devices that are located within a predetermined physical space. For example, identification module 104 may, as part of server 206 in FIG. 2, identify a collection of devices, illustrated as devices 210(1)-(*n*), that are located within a predetermined physical space.

Identification module 104 may identify devices 210(1)-(*n*) in a variety of ways. In some embodiments, identification module 104 may identify the collection of devices by identifying a command-and-control device that maintains a registry of devices registered to the command-and-control device. In such embodiments, identification module 104 may receive a list of devices and device identifiers from the command-and-control device. Additionally or alternatively, identification module 104 may identify the collection of devices by executing a device-discovery function of the command-and-control device. Such a device-discovery function may reveal the presence of any suitable devices within communications range of the command-and-control device. Once identification module 104 has identified the collection of devices, determination module 106 may determine the physical locations of each device.

At step 304, one or more of the systems described herein may determine the physical location of each device in the collection of devices. For example, determination module 106 may, as part of server 206 in FIG. 2, determine the physical location of each of devices 210(1)-(n).

Determination module 106 may determine the physical location of each device in a variety of ways. In some examples, determination module 106 may triangulate the position of a device based on wireless signals received from the device at a collection of access points. Additionally or alternatively, determination module 106 may retrieve location information from a database that associates devices with physical locations. For example, determination module 106 may retrieve location information from a registry maintained by a command-and-control device that contains physical-location information associated with each device in the registry. Additionally or alternatively, determination module 106 may request physical-location information from the device, such as GPS coordinates, and determine the physical location of the device based on the physical-location information.

In some embodiments, determination module 106 may determine relative physical locations for each device. That is, determination module 106 may determine which devices are within a physical proximity to each other. Determination module 106 may determine that devices are in physical proximity to each other in a variety of ways, including but not limited to evaluating wireless signal strengths, analyzing information captured through a monitoring function of a device (e.g., analyzing an image captured by a camera of a smartphone), comparing GPS coordinates, and/or any other suitable method of determining that various devices are in physical proximity of each other. For example, determination module 106 may direct a game console to scan for wireless signals and capture an image through a peripheral device attached to the game system. Determination module 106 may then determine that various other devices are in proximity to the game system based on the wireless signals detected and/or any objects recognized in the captured image.

In some examples, the systems and methods described herein may break an arbitrary physical space into regions based on boundaries and/or other delineations of separated spaces. For example, various elements of modules 102 may map boundary features of the predetermined physical space using at least one monitoring device. These boundary features generally represent separations between distinct regions of the predetermined physical space. Examples of boundary features include, without limitation, walls, windows, thresholds, stairs, railings, digital "fences," combinations of one or more of the same, and/or any other physical feature of a space that denotes a separation between distinct regions of that space.

In one embodiment, determination module 106 may map the boundary features of the predetermined physical space using a self-propelled monitoring device that is capable of moving through the predetermined physical space. For example, monitoring module 112 may direct a ROOMBA home cleaning device to move through a home and generate a map of the home. Determination module 106 may then use this map to determine various regions within the home and assign various devices to those regions.

Additionally or alternatively, determination module 106 may prompt a user to convey a moveable monitoring device through the predetermined physical space in order to identify the physical locations of boundary features and/or various devices. For example, a parent may survey the interior of their home using a MICROSOFT HOLOLENS. Determination module 106 may use the results of this survey to identify various boundary features and/or physical locations of various devices in the collection of devices.

Because some devices may move through or even enter or exit the predetermined physical space, one or more of modules 102 may track the physical location of at least one monitoring device over time. For example, a ROOMBA home cleaning device may move throughout the home whether on a scheduled cleaning cycle or at the direction of server 206. As an additional example, a user carrying a mobile phone may move throughout their home on their daily business and/or carry the phone with them when they leave the building. Determination module 106 may periodically update the physical locations of such relocatable devices, and matching module 110 may update which monitoring devices are matched to specific controlled devices, as will be described in greater detail below.

Returning to FIG. 3 at step 306, one or more of the systems described herein may establish, based on the collection of devices, (i) a list of controlled devices that are subject to an access control policy and (ii) a list of monitoring devices that are capable of monitoring user activity within a physical proximity. For example, establishing module 108 may, as part of server 206 in FIG. 2, establish, based on the collection of devices, list of controlled devices 212 and list of monitoring devices 214 that are capable of monitoring user activity within a physical proximity.

Establishing module 108 may establish list of controlled devices 212 in a variety of ways. In some embodiments, establishing module 108 may retrieve a list of registered devices that are subject to access-control policies from a command-and-control device. Additionally or alternatively, a supervisor or parent may manually configure list of controlled devices 212 to indicate which devices should be subject to monitoring. Some controlled devices may not support direct access control. For example, an old-model television may not include networking capabilities or have processing power to run access-control software. In such examples, these devices may be associated in list of controlled devices 212 with auxiliary devices that are capable of enforcing access-control policies on the controlled device, such as a smart power outlet that controls power to the device.

Establishing module 108 may establish list of monitoring devices 214 in a variety of ways. In some examples, establishing module 108 may establish the list of monitoring devices by determining monitoring functions that are available to each monitoring device and associating each monitoring device in the list of monitoring devices with the monitoring functions that are available to the monitoring device. For example, a command-and-control device may acquire information from each device that describes the capabilities of each device. Some devices, such as smartphones and/or video game peripherals, may report possessing a number of features, such as cameras, microphones, and/or Wi-Fi antennas.

Moreover, establishing module 108 may classify devices as moveable, self-propelled, or static devices. For example, a mobile phone is a small object that a user may pick up and carry, but the mobile phone is unable to move itself without user intervention. Thus, establishing module 108 may classify mobile phones and other similar devices, such as a MICROSOFT HOLOLENS, as moveable monitoring devices. Certain monitoring devices, such as a ROOMBA home cleaning device, may be able to move themselves through a physical space. Establishing module 108 may classify such devices as self-propelled monitoring devices. Some monitoring devices may be affixed to a solid object or otherwise not commonly relocated within a physical space. For example, a smart power outlet may be permanently affixed in a wall. As an additional example, a KINECT peripheral connected to a MICROSOFT XBOX game console is unlikely to be relocated. Establishing module 108 may thus classify these and other similar devices as static monitoring devices. Some static monitoring devices, such as home security cameras, may be capable of limited motion that allows them to change their field of view At step 308 in FIG. 3, one or more of the systems described herein may match each controlled device with at least one monitoring device that is capable of monitoring user activity within physical proximity to the controlled device. For example, matching module 110 may, as part of server 206 in FIG. 2, match each controlled device with at least one monitoring device that is capable of monitoring user activity within physical proximity to the controlled device.

Matching module 110 may match controlled devices with monitoring devices in a variety of ways. In some embodiments, matching module 110 may determine that certain monitoring devices are located within physical proximity to a controlled device, as described in greater detail above. Matching module 110 may then match the monitoring devices with the controlled device. For example, matching module 110 may determine that a smart phone with a microphone is within physical proximity to a game console. Matching module 110 may then match the game console with the smartphone.

In some embodiments, matching module 110 may match the controlled device with the monitoring device by determining that the monitoring device is capable of monitoring a particular region in proximity to the controlled device. For example, access-control systems may seek information about users who can view content displayed by a controlled device, such as a television. Users who are unable to view the screen of the television may in some cases be disregarded from consideration when enforcing access-control policies. In this example matching module 110 may match the television with monitoring devices that are able to monitor the area in front of the television screen.

In further embodiments, matching module 110 may match monitoring devices to particular regions rather than to controlled devices. In these embodiments, matching module 112 may match monitoring devices to regions such as those delineated by boundary features, as described in greater detail above. As will be described in greater detail below, monitoring module 112 may use monitoring devices matched to regions for a variety of purposes.

Matching module 110 may periodically update the matches, especially as certain devices may move through the physical space, or even leave the physical space entirely. For example, a user may carry their mobile phone with them as they go about their daily business. Matching module 110 may thus periodically update which monitoring devices are matched with each controlled device. In some embodiments, matching module 110 may only process updates for monitoring devices that are classified as moveable and/or self-propelled monitoring devices in order to save on computing resources. Furthermore, matching module 110 may update matches according to a variety of criteria. For example, determination module 106 may determine that a monitoring device has moved to a new physical location and cause matching module 110 to update the matches for that monitoring device. Additionally or alternatively, matching module 110 may review the matches according to a predetermined schedule, such as every five minutes.

Figure 4:
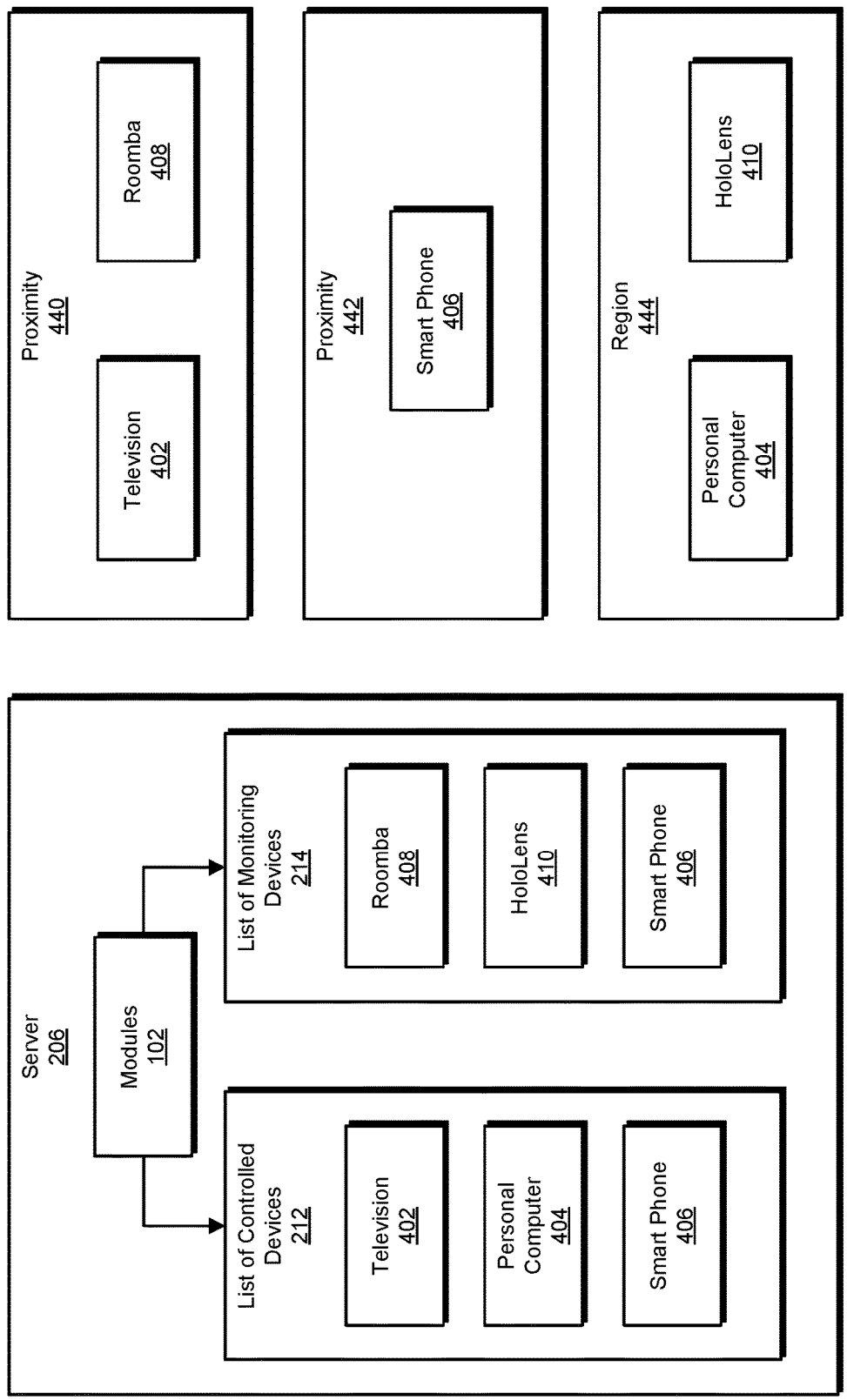
FIG. 4 is a block diagram of an example computing for matching controlled devices with monitoring devices.

FIG. 4 is an illustrated example of matching monitoring devices to regions and/or controlled devices. As shown in FIG. 4, one or more of modules 102 may generate list of controlled devices 212 and list of monitoring devices 214. Modules 102 may register a television 402, a personal computer 404, and a smart phone 406 to list of controlled devices 212 as devices that are subject to access-control policies. Additionally, modules 102 may register a ROOMBA cleaning robot (illustrated as Roomba 408), a MICROSOFT HOLOLENS (illustrated as HoloLens 410), and a smart phone 406 to list of monitoring devices 214 as devices that are capable of monitoring user activity. Matching module 110 may, as part of modules 102, utilize position information determined by determination module 106 to determine that television 402 and Roomba 408 are located within a proximity 440 of each other and accordingly match television 402 with Roomba 408. As described above, matching module 110 may match some devices to particular regions. In the example of FIG. 4, matching module 110 may determine that HoloLens 410 is located within a particular region 444 and associate HoloLens 410 with region 444. As will be described in greater detail below, monitoring module 112 may then use HoloLens 410 to monitor controlled devices within region 444, such as personal computer 404. Finally, matching module 110 may determine that smart phone 406 is represented on both list of controlled devices 212 and list of monitoring devices 214. Matching module 110 may accordingly match smartphone 406 with itself for purposes of monitoring user activity near smart phone 406.

In some examples, matching module 110 may match a single controlled device and/or region with multiple monitoring devices. For example, if a user carrying smart phone 406 enters proximity 440 to watch television on television 402, matching module 110 may update the device matchings to match television 402 with both Roomba 408 and smart phone 406. Monitoring module 112 may use information from one or both of these devices to monitor the user's activity within proximity 440. Similarly, a single monitoring device may be matched to multiple controlled devices and/or regions. For example, if the user carrying smart phone 406 enters region 444, matching module 110 may match smart phone 406 with both itself and region 444.

Returning to FIG. 3 at step 310, one or more of the systems described herein may monitor, for each controlled device and by each monitoring device matched to the controlled device, user activity within proximity to the controlled device. For example, monitoring module 112 may, as part of server 206 in FIG. 2, monitor, for each controlled device and by each monitoring device matched to the controlled device, user activity within proximity to the controlled device.

Monitoring module 112 may monitor user activity in a variety of ways. For example, monitoring module 112 may receive monitoring data from monitoring devices on a continual basis. Additionally or alternatively, monitoring module 112 may acquire monitoring data from certain monitoring devices only when certain criteria are met. These two monitoring modes are not mutually exclusive, and indeed, monitoring module 112 may stream data from certain monitoring devices to determine when to acquire additional monitoring data from other devices. For example, monitoring module 112 may monitor user activity within proximity of a personal computer via a webcam and a router. Monitoring module 112 may continuously monitor network activity via the router and only request monitoring information from the webcam when monitoring module 112 determines that a user is attempting to access restricted online content.

In embodiments where matching module 110 has matched monitoring devices to particular regions, monitoring module 112 may use those monitoring devices to monitor that particular region. In some examples, monitoring module 112 may monitor controlled devices within a region through monitoring devices matched to that region. As a specific example, determination module 106 may determine that a smart phone, a television, and a game console exist within a particular region. Monitoring module 112 may monitor usage of these devices through a MICROSOFT KINECT that is associated with that region. As an additional example, matching module 110 may match a wall-mounted intercom system and a security camera with a bathroom in an assisted living facility. In this example, monitoring module 112 may continuously receive monitoring information from a microphone of the intercom system, but, in order to protect patient privacy, only activate the camera if information received from the microphone indicates that a patient is in distress.

Figure 5:
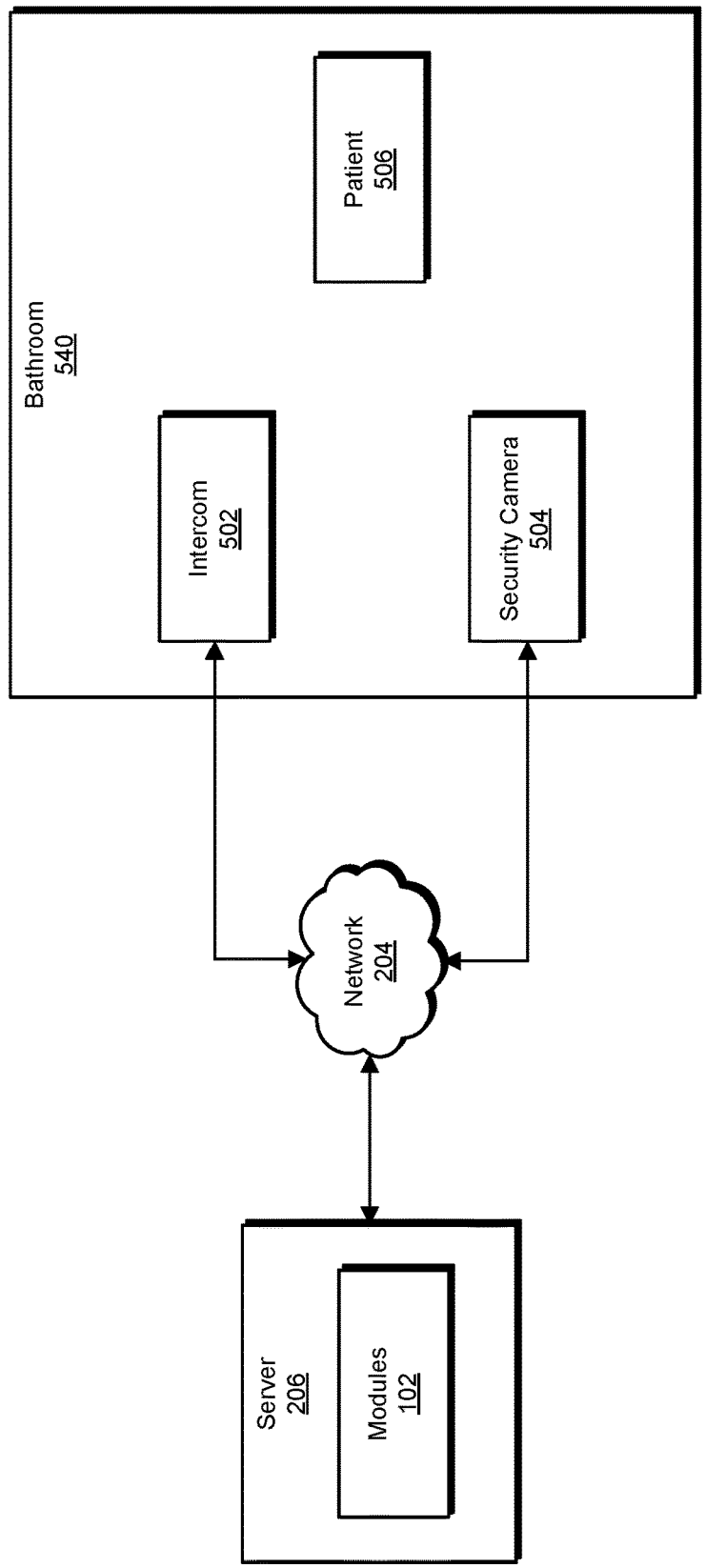
FIG. 5 is a block diagram of an example computing system for monitoring a specific region.

FIG. 5 is an illustration of an example system for monitoring a particular room or region. As illustrated in FIG. 5, a bathroom 540 in an assisted living facility may be equipped with an intercom 502 and a security camera 504. As described in greater detail above, matching module 110 may have matched bathroom 540 with intercom 502 and security 504 for purposes of monitoring user activity within bathroom 540. Monitoring module 112 may continuously receive audio information from intercom 502, while refraining from acquiring video information from security camera 504 in order to protect patient privacy. However, should a user such as patient 506 call for help or otherwise vocally indicate that they are in distress, monitoring module 112 may begin acquiring video information from security camera 504. Moreover, monitoring module 112 may perform a security action based on patient 506 verbalizing a request for assistance. For example, monitoring module 112 may alert a caretaker that patient 506 is in distress and provide the caretaker with a video feed of bathroom 540 to allow the caretaker to respond in an appropriate fashion. The systems and methods described herein may thus allow caretakers to quickly respond to patient needs.

Other examples of security actions that may be performed by the systems and methods described herein include, depending on context and without limitation, disabling a controlled device, disabling a function of a controlled device, generating a log entry that describes the user activity within proximity to the controlled device, and/or notifying an administrator or supervisor of the user activity.

As described in greater detail above, the systems and methods described herein may match monitoring devices to controlled devices and/or particular regions. The disclosed systems and methods may thereby enable access-control systems, security systems, or other monitoring systems to perform their functions regardless of the number and/or types of monitoring devices available.

Figure 6:
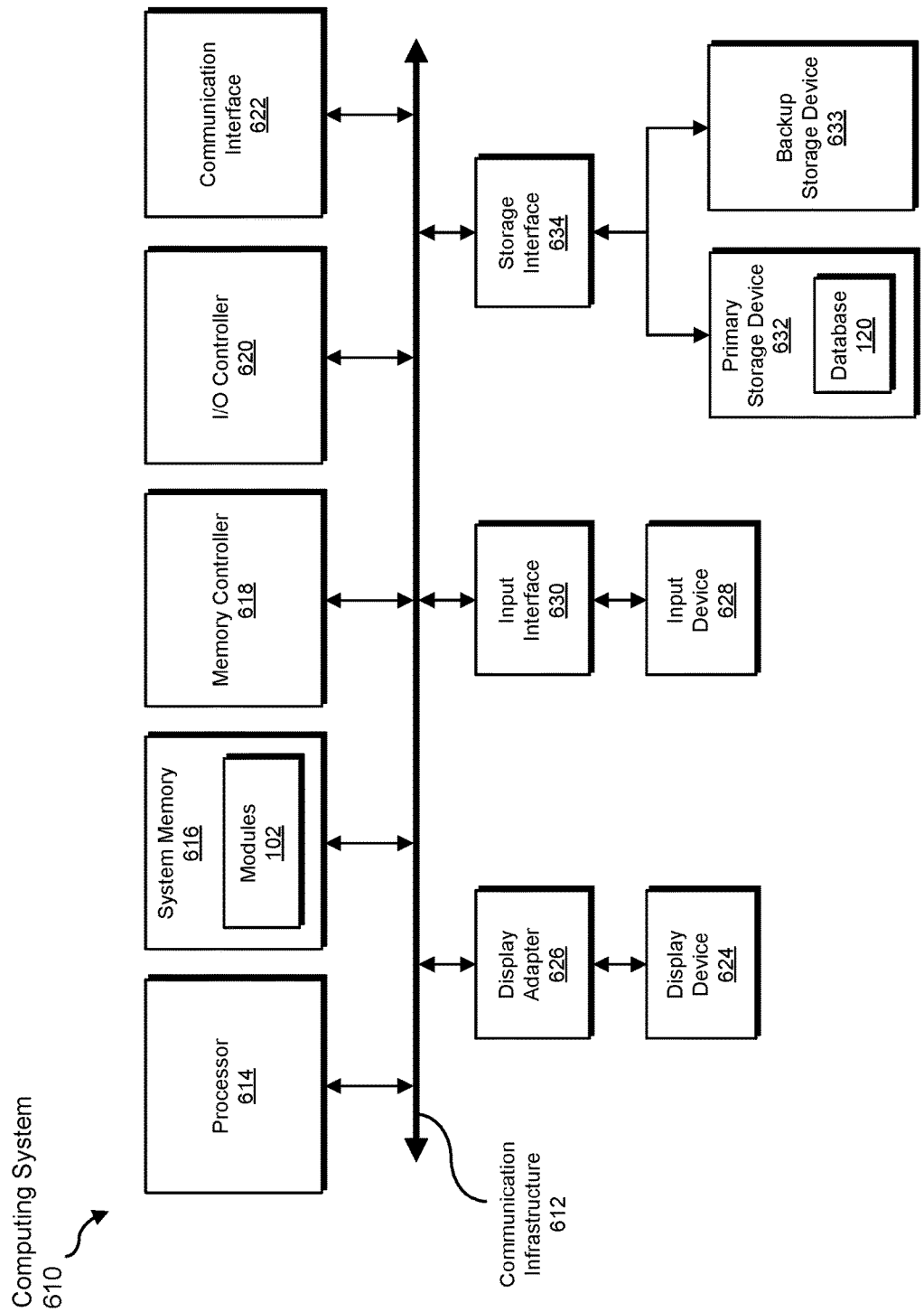
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, computing system 610 may also include at least one input device 628 coupled to communication infrastructure 612 via an input interface 630. Input device 628 generally represents any type or form of input device capable of providing input, either computer or human generated, to computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 610 may be configured as an Application Specific Integrated Circuit (ASIC) adapted to implement one or more of the embodiments disclosed herein.

Figure 7:
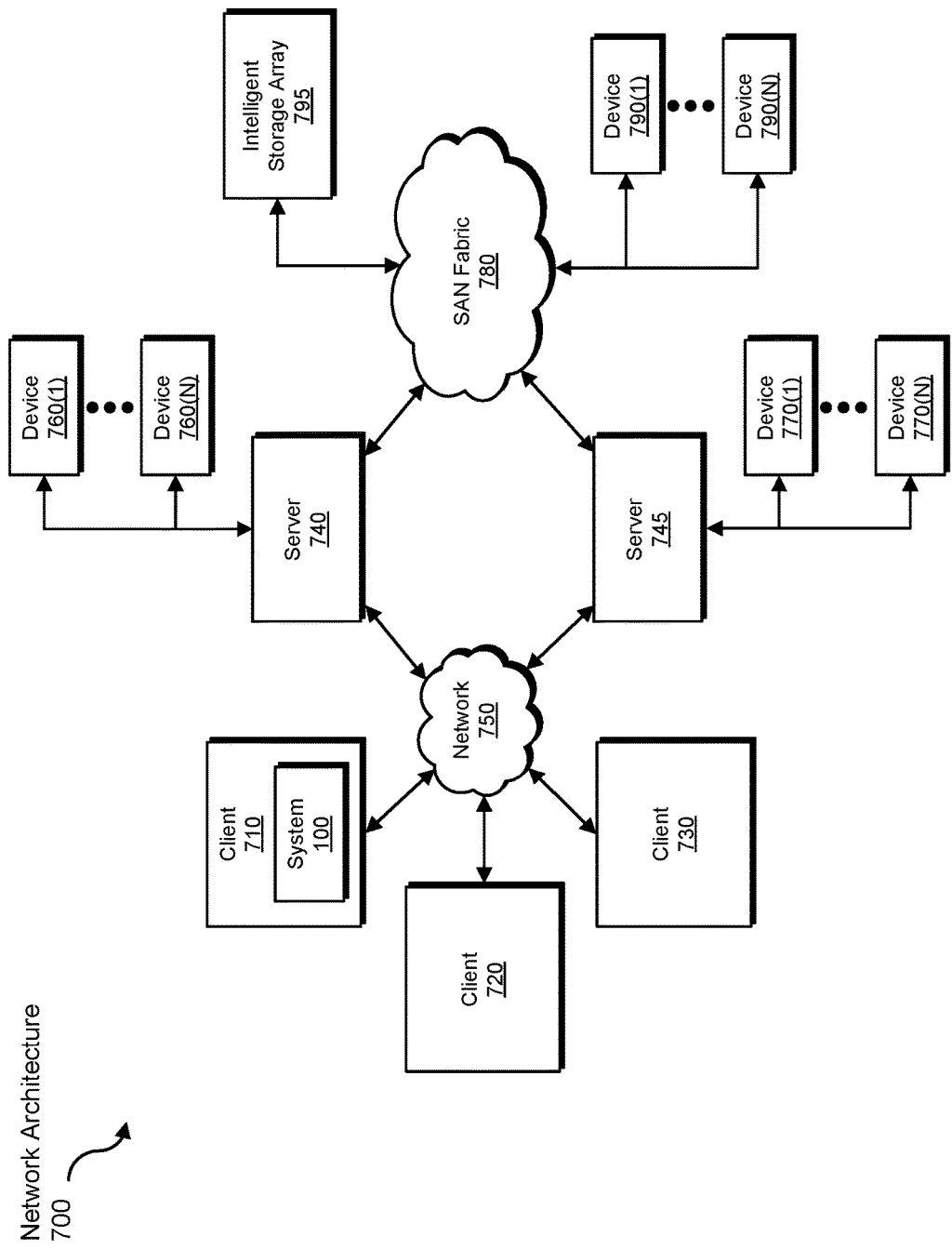
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing access-control policies in an arbitrary physical space.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various methods described and/or illustrated herein may also omit one or more of the steps described or illustrated herein or include additional steps in addition to those disclosed.

While various embodiments have been described and/or illustrated herein in the context of fully functional computing systems, one or more of these embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the embodiments disclosed herein.

In addition, one or more of the modules described herein may transform data, physical devices, and/or representations of physical devices from one form to another. For example, one or more of the modules recited herein may receive information identifying a collection of devices to be transformed, transform the information into a list of controlled devices and a list of monitoring devices, output the lists to a database, use the transformed lists to match monitoring devices to controlled devices, use a result of the matching to monitor users who attempt to access the controlled devices, and/or enforce access-control policies on the controlled devices based on monitoring the users who attempt to access the controlled devices. Furthermore, one or more of the modules described herein may undertake one or more security actions based on monitoring the users, such as using a result of the monitoring to generate a log file that describes the user's attempt to access the controlled device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the embodiments disclosed herein. This description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method for enforcing access-control policies in an arbitrary physical space, at least a portion of the method being performed by a computing device comprising at least one processor, the method comprising:

identifying a collection of devices that are located within a predetermined physical space;

determining a physical location of each device in the collection of devices;

establishing, based on the collection of devices:
- a list of controlled devices, selected from the collection of devices, that are subject to an access-control policy that describes restricted functions of each controlled device in the list of controlled devices; and
- a list of monitoring devices, selected from the collection of devices, that are capable of observing actions performed by users within a physical proximity;

matching, based at least on comparing the physical locations of each device in the collection of devices, each of the controlled devices with at least one of the monitoring devices that is capable of observing actions performed by users within physical proximity to the controlled device;

monitoring, for each of the controlled devices and by each of the monitoring devices matched to the controlled device, one or more actions performed by a user as part of a user attempt to access a restricted function from among the restricted functions of the controlled device; and performing a security action based on the user attempt to access the restricted function of the controlled device that was observed by at least one monitoring device that is matched to the controlled device.

2. The method of claim 1, wherein identifying the collection of devices comprises identifying a command-and-control device that maintains a registry of devices registered to the command-and-control device.

3. The method of claim 2, wherein identifying the collection of devices comprises executing a device-discovery function of the command-and-control device.

4. The method of claim 1, further comprising mapping, by at least one of the monitoring devices in the list of monitoring devices, boundary features of the predetermined physical space, wherein the boundary features denote separations between distinct regions of the predetermined physical space.

5. The method of claim 4, wherein the monitoring device used to map the boundary features of the predetermined physical space comprises a self-propelled monitoring device that is capable of moving through the predetermined physical space.

6. The method of claim 4, wherein the boundary features comprise at least one of:
- a wall;
- a window;
- a threshold;
- stairs; and
- a railing.

7. The method of claim 1, wherein establishing the list of monitoring devices comprises:
- determining monitoring functions that are available to each of the monitoring devices; and
- associating each of the monitoring devices in the list of monitoring devices with the monitoring functions that are available to the monitoring device.

8. The method of claim 1, further comprising tracking the physical location of at least one monitoring device over time.

9. The method of claim 1, wherein matching the controlled device with the monitoring device comprises determining that the monitoring device is capable of monitoring a particular region in proximity to the controlled device.

10. The method of claim 1, wherein performing the security action comprises at least one of:
- disabling the controlled device;
- disabling a function of the controlled device;
- generating a log entry that describes the user activity within proximity to the controlled device; and
- notifying an administrator of the user activity.

11. A system for enforcing access-control policies in an arbitrary physical space, the system comprising:
- an identification module, stored in a memory of the system, that identifies a collection of devices that are located within a predetermined physical space;
- a determination module, stored in a memory of the system, that determines a physical location of each device in the collection of devices;
- an establishing module, stored in a memory of the system, that establishes, based on the collection of devices:
  - a list of controlled devices, selected from the collection of devices, that are subject to an access-control policy that describes restricted functions of each controlled device in the list of controlled devices; and
  - a list of monitoring devices, selected from the collection of devices, that are capable of observing actions performed by users within a physical proximity;
- a matching module, stored in a memory of the system, that matches, based at least on comparing the physical locations of each device in the collection of devices, each of the controlled devices with at least one of the monitoring devices that is capable of observing actions performed by users within physical proximity to the controlled device;
- a monitoring module, stored in a memory of the system, that:
  - monitors, for each of the controlled devices and by each of the monitoring devices matched to the controlled device, one or more actions performed by a user as part of a user attempt to access a restricted function from among the restricted functions of the controlled device; and
  - performs a security action based on the user attempt to access the restricted function of the controlled device that was observed by at least one monitoring device that is matched to the controlled device; and
- at least one physical computer processor configured to execute the identification module, the determination module, the establishing module, the matching module, and the monitoring module.

12. The system of claim 11, wherein the identification module identifies the collection of devices by identifying a command-and-control device that maintains a registry of devices registered to the command-and-control device.

13. The system of claim 12, wherein the identification module identifies the collection of devices by executing a device-discovery function of the command-and-control device.

14. The system of claim 11, further comprising a mapping module, stored in memory, that maps, by at least one of the monitoring devices in the list of monitoring devices, boundary features of the predetermined physical space, wherein the boundary features denote separations between distinct regions of the predetermined physical space.

15. The system of claim 14, wherein the monitoring device used to map the boundary features of the predetermined physical space comprises a self-propelled monitoring device that is capable of moving through the predetermined physical space.

16. The system of claim 14, wherein the boundary features comprise at least one of:
   a wall;
   a window;
   a threshold;
   stairs; and
   a railing.

17. The system of claim 11, wherein the establishing module establishes the list of monitoring devices by:
   determining monitoring functions that are available to each of the monitoring devices; and
   associating each of the monitoring devices in the list of monitoring devices with the monitoring functions that are available to the monitoring device.

18. The system of claim 11, further comprising a tracking module, stored in memory, that tracks the physical location of at least one monitoring device over time.

19. The system of claim 11, wherein the matching module matches the controlled device with the monitoring device by determining that the monitoring device is capable of monitoring a particular region in proximity to the controlled device.

20. A non-transitory computer-readable medium comprising one or more computer-readable instructions for enforcing access-control policies in an arbitrary physical space that, when executed by at least one processor of a computing device, cause the computing device to:

identify a collection of devices that are located within a predetermined physical space;
determine a physical location of each device in the collection of devices; establish, based on the collection of devices:
   a list of controlled devices, selected from the collection of devices, that are subject to an access-control policy that describes restricted functions of each controlled device in the list of controlled devices; and
   a list of monitoring devices, selected from the collection of devices that are capable of observing actions performed by users within a physical proximity;
match, based at least on comparing the physical locations of each device in the collection of devices, each of the controlled devices with at least one of the monitoring devices that is capable of observing actions performed by users within physical proximity to the controlled device;
monitor, for each of the controlled devices and by each of the monitoring devices matched to the controlled device, one or more actions performed by a user as part of a user attempt to access a restricted function from among the restricted functions of the controlled device; and
perform a security action based on the user attempt to access the restricted function of the controlled device that was observed by at least one monitoring device that is matched to the controlled device.

* * * * *